Jan. 25, 1966   R. L. OLSON   3,231,255
FRICTION DEVICES INCLUDING SHOCK ABSORBING
DAMPERS AND THE LIKE
Filed Oct. 2, 1963   2 Sheets-Sheet 1

INVENTOR.
Richard L. Olson
BY
ATTORNEYS

Jan. 25, 1966

R. L. OLSON 3,231,255

FRICTION DEVICES INCLUDING SHOCK ABSORBING
DAMPERS AND THE LIKE

Filed Oct. 2, 1963

INVENTOR.
Richard L. Olson
BY
ATTORNEYS

United States Patent Office 3,231,255
Patented Jan. 25, 1966

3,231,255
FRICTION DEVICES INCLUDING SHOCK ABSORBING DAMPERS AND THE LIKE
Richard L. Olson, Chicago, Ill., assignor to Dike-O-Seal, Incorporated, Chicago, Ill., a corporation of Illinois
Filed Oct. 2, 1963, Ser. No. 313,391
10 Claims. (Cl. 267—1)

This invention relates to motion damping, and more particularly concerns shock absorption or damping between two opposing members or bodies which are relatively movable toward one another and wherein such bodies sometimes have portions which move toward one another in opposite directions in the course of a cycle of movement with a requirement for damping shock movements in one or both directions of movement.

This application is a continuation-in-part of my copending application Serial No. 123,917, filed May 26, 1961 and now patent 3,166,332, dated January 9, 1965, and as to common subject matter is concerned with the aspect or area of friction devices including shock absorbers or dampers, with the delineation being drawn to include herein primarily methods of and devices for damping motions between two or more relatively movably associated bodies or members or portions thereof, having therebetwen bulk compressible multi-closed-cell plastic damping material and which are normally held apart by the action of means such as a spring (and including inherent mechanisms or systems of apparatus such as the springs of vehicles, the return spring associated with draft gear buffers and the like, hydraulic and mechanical return and cycling systems, etc.), namely, wherein the primary function of the inventive subject matter resides in the damping, shock absorbing, snubbing, buffing, frictional resistance, energy absorption types of work as distinguished from primarily spring action wherein damping or energy absorption is secondary while the return of relatively movable objects to a predetermined or equilibrium relationship is primary. Thus, herein are included shock absorbing applications of the invention wherein liquid damping is one aspect and even possibly the primary aspect, although there are numerous damping applications of the invention that may not need the hydraulic damping feature and wherein the present invention may even replace hydraulic damping altogether.

As pointed out in said copending application, there have been previously unappreciated as well as unsolved problems, difficulties and limitations relating to various types of resiliently deformable or flexible or yieldable members or mechanisms for use betwen relatively movable and relatively rigid members for such purposes as friction devices, including shock absorbers, vibration dampers, flutter dampers, or other types of dampers, all hereinafter referred to generally as dampers. More especially, prior art or previously known members of flexible or elastomeric materials intended to be highly flexibly deformable (as for a large amount of travel by bulk formation or to give a close or complete conformation to an engaged surface), have been quite limited or deficient since such solid (flowably deflectable, and substantially incompressible) material members had to deform or flex as wholes and without change in volume and their softness or flexible conformability was limited or determined by the flexibility and softness of the material itself, but which had to be relatively and undesirably stiff to provide adequate strength, wear resistance and other properties.

As another and more specific examples, previous friction devices were often desired to have very rapidly increasing spring rates (that is, to be initially very soft or of a low spring rate and to progressively and rapidly become stiffer or of high spring rates upon increasing loads or deflections), but simple or economic prior art forms of such devices have had relative non-linear spring rates so that various complex and costly multi-step configurations and other expedients have been employed to achieve such rapidly increasing spring rates.

As another such example, it is noted that where it has been desired to use confinement in a rigid body and also to use a resilient compression of gas or air to achieve rapidly increasing spring rates and for related such purposes that such devices have suffered from short life, sealing difficulties, high cost and difficulties in holding high gas pressures under high loads or for long travels and in general, from complexity.

Still another such example is to be found in the fact that prior art dampers of or utilizing elastomeric material have suffered from difficulties and the problems similar to those noted above and including practical or economic inability to obtain the desired softness or long deflections and the correspondingly high energy absorptions.

Accordingly, and with the foregoing in mind, the general objects of this invention are to solve or at least reduce the above-noted and other known problems or difficulties of the prior art, to provide improved performance features in dampers by the use of bubble-containing deformable plastic material wherein at least a substantial portion of the volume of the mass of the material is provided with a plurality of gas filled, unconnected, discrete and independently acting, generally bubble-like cells, although there may also be included in the mass of material liquid filled cells to increase the internal frictional resistance of the mass beyond that afforded by the plastic matrix.

Another object of the invention is to provide a new and improved method of damping motions between two bodies attaining in a simple, efficient and inexpensive manner all of the advantages of initial low stiffness or spring rates and progressively and rapidly increasing stiffness or spring rates without complexity of form or parts.

A further object of the invention is to provide a new and improved method of and means for damping readily adaptable to either direct mechanical contact uses between relatively movable objects or bodies, or damping arrangements wherein a damping liquid is interposed between the members or bodies to afford a primary or secondary damping function.

Still another object of the invention is to provide a new and improved method of and means for damping utilizing the increasing spring rate characteristics of a multi-closed cell deformable plastic material having at least some gas filled generally bubble-like cells whereby the damping mass is bulk compressible at least partly into itself during its damping function.

Yet another object of the invention is to provide a new and improved method of and means for damping wherein a multi-closed cell gas bubble damping mass developing internal frictional heat during damping is efficiently cooled by heat transfer therefrom.

Other objects, features and advantages of the present invention will be apparent from the following detailed description of certain preferred embodiments thereof taken in conjunction with the accompanying drawings, in which.

Figure 1:
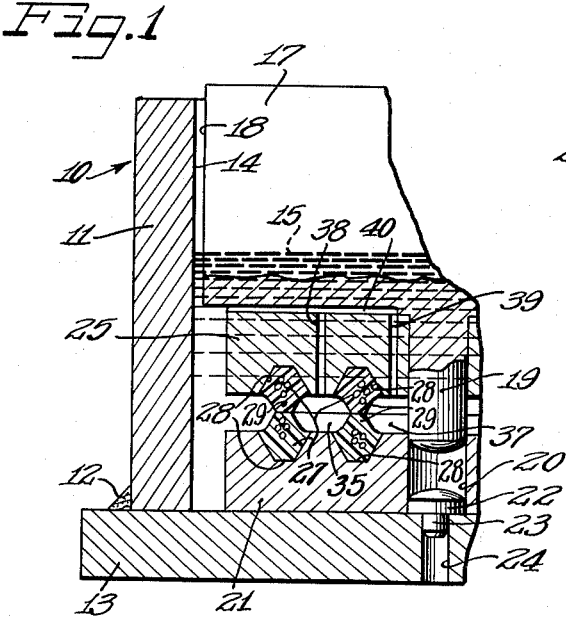
FIGURE 1 is a fragmentary, axial section taken through a damper assembly embodying features of the invention.

As one of many different forms and arrangements of damping devices, FIGURE 1 (corresponding to FIGURE 16 in Serial No. 123,917) shows a representative combination hydraulic and multi-closed cell plastic mass device 10. In the specific form shown, the damping device 10 is especially adapted for heavy duty uses such as in reciprocatory apparatus of which punch presses, reciprocatory machine tools, power hammers, and the like, are examples. Upright cylindrical side wall 11 is connected as by welding 12 to a suitable base such as a plate 13 to provide an internal cylindrical surface 14 and providing a container or compression chamber into which is filled a suitable damping liquid 15, of which oil is an example.

Relatively axially reciprocably disposed within the cylinder 14 is a complementary cylindrical piston or plungerlike member 17 which may, as shown, have its upper end exposed for impact thereagainst of a member or body of apparatus with which the damper is associated and movable toward another member or body of the apparatus supporting the base 13. On the other hand, the piston 17 may be suitably connected to a reciprocating or at least impact receiving member or body of the associated apparatus, to limit its travel.

On its perimeter 18, the piston 17 is suitably fitted in the cylinder 14 for reciprocal movement, in this instance loosely, which serves to provide a restricted hydraulic damping passage between the perimeter and cylinder, as is a known expedient in the shock absorber art. If preferred, the interface fit of the cylinder and piston may desirably be substantially liquid-tight in a known or preferred manner.

Where the piston is relatively loosely mounted with respect to the cylinder, it may be provided with guide means herein comprising a central depending stem or pin 19 slidably engaged in a complementary guide bore hole 20 in a lower plate 21 in the bottom of the compression chamber. This plate 21 which, as shown, is of smaller diameter than the cylinder 14 is held centered by a button member 22 having a top engaging in the lower end of the bore 20 and provided with a reduced diameter downwardly projecting centering pin end portion 23 fitted in a corresponding hole 24 in the base plate 13. If preferred, the button member 22 may be a valve such as a foot valve or one-way replenishing valve with the hole 24 comprising a replenishing passage.

According to the present invention, damping means are provided between the piston 17 and the plate 21. The material of such means is of itself substantially incompressible but in at least a substantial portion of its volume is provided with a plurality of gas filled, unconnected, discrete and independently acting, generally bubble-like cells. Hence, when the bodies or members the motion of which is to be damped are moved toward one another such motion will be translated into compression force onto the mass of material, and by such force the volume of the mass will be reduced by reducing the volumes of the gas filled cells at increasing spring rates coupled with rapid generation of internal friction in the mass to damp the motion. Damping friction by deformation of the cell interwalls is generally of a laminar type or generally linearly proportional to velocity. To this end, the piston 17 is provided on its lower end with a reduced diameter cylindrical plate 25 similar to the lower plate 21 centrally bored and held concentric with the piston by the projection 19 extending therethrough. Within the opposing faces of the plates 21 and 25 are repsective opposed concentric compressible closed ring bubble-elastomer damping members 27 each of which is mounted in a respective annular groove 28 and has a projection 29 provided with a crown 30 which engages the corresponding crown top or outer surface of the opposed compressible damping member 27. Each of the damping members 27 has the opposite side walls sloped and with a smoothly curved portion or radius 31 merging into a flatter base surface or side portion 32 joining the flat face of the associated damper plate and spacing the projections 29 laterally from the edges defining the respective grooves 28. It will be understood that one or as many of the damping members 27 will be used as calculated to be reasonably necessary for the damping requirements of the apparatus, two sets of the opposed cooperating ring-shaped damping members being shown in the illustrated example. Further, although compound damping efficiency is attained by having opposed pairs of the damping mass members 27, such damping mass members may be provided in only one of the opposing faces of the plates 21 and 25 and with the crown or crowns of the damping mass members engageable against the opposing flat face for damping contact.

Each of the damping mass members 27 is made from a compressible, cellular elastomer possessing a high degree of resiliency. While cellular rubber as such may be used, different types of synthetic resinous or plastic materials that are capable of being molded and set to a compressible, cellular elastomer may be used. The damping material is conformed to the contour of the trench or groove 28 and bonded thereto with such adherence that during compression strokes of the piston, the damping mass or body will not separate from the surfaces defining the groove.

The material used for the damping mass 27 may be such as to be cured in situ by vulcanization or baking. To this end, the composition of the selected material may include suitable natural or synthetic rubber, a plasticizer, a vulcanizing agent, a gas liberating agent capable upon the application of heat of liberating substantial quantities of gas and thereby swelling or expanding the elastomeric composition and producing a self-sustaining, resilient, elastic multi-cellular rubber-like body. This is adapted to be accomplished by forming the groove 28 in the respective plate, and then applying a matching master plate with a matching groove corresponding to the preferrred width and shape and depth of the projectiotn 29 and with a suitable quantity of the raw material for the damping member placed into one of the grooves so that when the grooved members are assembled a complete chamber of the confronting grooves is present. The assembly is then placed in a curing oven and subjected to proper temperature for the proper length of time to effect expansion and curing of the damping mass into a homogeneous cellular body. By having the surfaces within the grooves of the damper member and the master plate treated to assure active bonding of the material to the groove 28 as an incident to the curing process and by having the surface of the master plate opposing the groove 28 treated to assure non-adherence thereto of the material of the damping mass, upon separation of the master plate from the damper member, after curing, the damping mass separates from the master plate but is carried bonded to the damper member.

By virtue of the separation treatment of the master plate surfaces and by virtue of the internal pressure developed within the damping member or mass material during the curing, a skin 33 (FIG. 2) may be formed providing the surfaces of the projection 29. Interiorly the damping mass has gas filled, unconnected, discrete generally bubble-like cells 34 with a cell wall matrix connected throughout the body of the damping mass and affording a highly efficient internal friction damping structure. The percentage of intercellular material to aggregate cell volume may be varied widely to accommodate service requirements.

Instead of vulcanization curing, some materials suitable or preferred in certain damper situations lend themselves to self-curing from a fluent state, e.g. certain polyurethane formulations.

Silicone type rubbers are especially desirable for certain applications of the invention because of their high temperature resistance, and also because of superior bubble forming and bubble holding properties.

The cells or bubbles 34 need not all be of the same sizes, materials or other properties, since the advantages of this invention may be realized by the use of various mixtures or blends of different types of materials for the same or different cells or bubbles. As an example, different sizes or strengths of bubbles may be employed, such as smaller and inherently stronger bubbles in regions where greater strength is required, as adjacent to or forming the wear resistant or strength skin for the exposed or non-confined surfaces or at least in part of the projecting or highly deformed portion of the damping mass, with larger bubbles, which have lower inherent spring rates and initial stiffnesses or are more readily compressed in the well-protected interior or confined portions. These variables as to bubbles and/or materials are attainable either by molding, and controlled curing teachniques, or by layering or stacking (combining) performed masses having preferred characteristics and damping values.

Not all of the fluid or deformable material filling the bubbles 34 need be elastically compressible or a gas, since a suitable percentage or part of the bubbles may be filled with some other material such as a liquid to provide a high degree of friction or energy absorption where a highly viscous material or liquid is so employed. This permits the introduction of any reasonably desired amount or percentage of damping, shock absorbing or frictional action into the deformable damping mass according to this invention, affording built-in shock absorbing characteristics by reason of such viscous liquid filled cells being deformed during the preferably long travel or relatively flexible deformation of the unitary flexible damping member or mass. This action may be in addition to the damping or friction action given by the deformation of the cell walls themselves, particularly where they are of a soft rubber-like material. Where a substantial percentage of the bubbles are filled with a readily deformable and friction producing and highly viscous liquid, their friction producing action will be very much greater than that given by the relatively smaller amount of cell wall material, particularly since it is usually not feasible or practical to provide adequately strong cell walls from very soft elastomeric materials or from low durometer rubber-like materials having high degree of internal friction and a high deformability or softness.

As will be well understood by those skilled in this and related arts, various highly viscous compounds or materials and, particularly high viscous liquids may be used to fill such small and initially separate bubbles or sealed cells, subsequently bonded or adhesively secured together, all according to known techniques. The wide range of elastomeric materials which may be used for the cell walls under this invention will thus affect not only the softness and the spring properties of the deformable damping members or masses, but since these different materials may have rather widely varying strengths, they will also affect the strength of the cells as well as the life or wear resistance of such members.

The spring stiffness or softness and the shape of the spring rate curve (as more particularly disclosed in my application Serial No. 123,917) of the damping mass will also be modified by the cell wall thickness and by the elasticity of the elastomeric material. The percentage or part of the total volume of such damping mass which is occupied by the flexible or elastomeric wall material in relation to the remaining part of the volume occupied by gas will determine how much such damping mass or member can be bulk compressed (neglecting the very small compressibility of the elastomer itself).

As the projection 29 is increasingly deformed and bulk compressed into the confined body part of the body of the damping mass 27 by the gas compression in the cells 34, an increasing percentage of all of the fluid filled cells are at about the same pressures. However, these transmitted pressures progressively reduce in approaching an unconfined boundary surface since each bubble wall has its own elastic stiffness or resistance to deformation. Moreover, there is a strong resistance to blowing out or bursting under high pressures of the confined gas in the bubbles. For a given or desired precentage of confined gas relative to the total volume, this progressive reduction in transmitted pressures and bursting forces is greater for smaller diameter or smaller volume bubbles and increases rapidly as they become smaller, down to practical limits. For example, particularly for high strength materials and for high percentages of confined gas in the bubbles 34 the upper limit for the diameters of the effective preponderances of the bubbles may be on the order of about 0.02 to 0.03 inch to thereby benefit by the rapidly increasing resistance against bursting and flexural strength as is desirable. The lower limit, particularly for low percentages of confined gas, is a practical one, depending on the ability to form interbubble walls of correspondingly reduced thickness with particular materials and by particular expanding, blowing, or bubble forming techniques and is about 0.001 inch diameter or somewhat less for strong material and relatively thick walls. Generally it is simpler to form the bubbles more or less uniformly throughout the mass, except at the progressive transition or boundary region, as it merges into the skin 33. The particular ranges or values for bubble sizes need not apply to each and every closed cell since a small percentage, such as 10% to 15% or more, may be undesirably too large or too small without material adverse effects so long as the effective preponderance of the bubbles are in the preferred range of sizes, particularly in the more critical regions effectively close to an unconfined surface. Nitrogen filled bubbles are desirable.

An advantage of the partial confinement of the mass within the recess or groove 28 resides in that as the confinement increases progressively in a related or matched fashion to the compressing or engaging loads as the projecting portion 29 is compressed or displaced down into the initially confined portion of the body of the mass there is a high ability of the gas filled cells 34 to withstand very high pressures without bursting of the cells or outer skin 33 since the bubbles or cells are increasingly confined and restrained against bursting as the pressures increase. Further, as the volume of the mass is progressively reduced there is a resultant rapid increase in the spring rate and a rapid generation of internal friction in the mass to damp relative motion, or vibrations which always involve relative motion whether of low or high frequency.

For an initially low spring rate, the bubble cells 34 are preferably at a relatively low but positive gas pressure. Initially higher spring rates are obtainable by providing relatively higher initial pressures up to the strength limits of the cell wall material, as desired.

Figure 2:
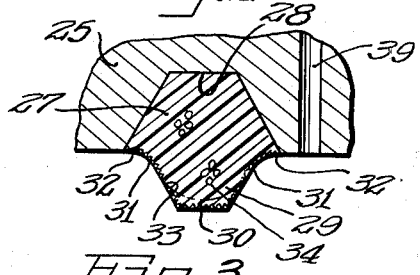
FIGURE 2 is an enlarged fragmentary sectional view through one of the elastomeric damping masses of FIGURE 1.
Figure 3:
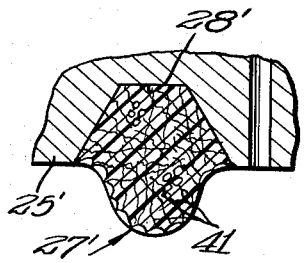
FIGURE 3 is a fragmentary sectional view similar to FIGURE 2 of a modification with internal heat dissipating means.

The life of the projecting portion 29 and particularly its skin 33 can be substantially increased where its crown profile is of smoothly progressive changing and reversing curvature as indicated in dash outline in FIGURE 2 and in full line in FIGURE 3. This ogee curvature is without any abrupt changes in curvature or sharp bends or high stress points either initially or at any time during its deflection and deformation to a narrower width as it is pressed down by bulk compression into the body of the damping mass and toward the cavity or recess 28 and by a progressively widening engagement either with a rigid surface or with another surface deformable member as shown in FIGURE 1 or even by external hydraulic fluid action as by the liquid 15 under appropriate damping circumstances. The ogee curve flattens out smoothly and progressively into a straight line without any abrupt bends or stress concentrations on the surface of the skin 33. The strong yet softly deformable gas filled bubbles cooperate with this ogee curvature to offset any appreciable or material forces acting outwardly or tending to burst the skin or bulge it outwardly at right angles, particularly where the bubbles decrease in size to progressively form the skin 33. The rapidly increasing spring rates of the gas filled bubbles 34 cooperate in giving this important result.

As will be clear, upon relative movement of the piston 17 and the base member 13 and the cylindrical member 11 as occasioned by the similar movement of the bodies of the associated apparatus requiring damping, there will be corresponding pressure applied to the damping liquid 15, if present, in the compression chamber within the cylinder. Since the damping masses 27 are bulk compressible, they are yieldably responsive to such compression of the damping liquid thereagainst and due to their energy absorption capability effectively react dampingly.

In addition, whether or not the individual damping mass 27 is initially in contact with an opposing member or surface, the bulk compression effected upon such contact during the relative motion of the opposed bodies of the apparatus requiring damping, further results in reducing the volume of the damping mass 27 and the consequent damping effect of such direct, mechanical displacement of the damping material into itself.

For some purposes it may be desirable to trap damping fluid substantially inescapably in a space 35 between adjacent radially spaced concentric ones or coactive pairs of the elastomeric damping masses 27, with the members 27 acting as seals and being bulk compressed by the compressed, trapped damping fluid, in addition to the bulk compression effected by movement of the opposing rigid bodies toward one another. This same condition may be present in a space 37 between the guide pin 19 and the adjacent damper mass ring or rings 27. On the other hand, for high deflections or travels, it is desirable to vent the hydraulic damping fluid from the space or spaces 35 and 37. For this purpose, suitable restricted passages or vents 38 and 39 providing damping orifices may be provided to afford a desired or predetermined shock absorber action as the fluid is forced therethrough and into a clearance space 40 between the piston 17 and the plate 25 into the main chamber in the cylinder 14. While both of the spaces 35 and 37 have been shown as provided with damper orifice ports, either of the spaces may be ported while the other space is not ported. Further, although two damping fluid trapping spaces 35 and 37 have been shown, only one such trapping space may be employed, or there may be a preferred greater number than two of such spaces, depending upon the desired damping effect.

As a result of the energy absorption during damping, substantial heat may develop in the elastomeric damping mass or masses 27. In the relatively small unit volume of the damping mass 27 at any given point, the metal of the associated mounting member or plate, herein the plates 21 and 25, serves as a heat transfer medium whereby heat is transferred from the engaged elastomeric damping mass. In addition, where the space between the opposing members or bodies within which the damping mass is located contains fluid (and for this purpose it may be a gas such as air or liquid) which is motivated into a relatively circulating movement during the motions to be damped, additional cooling of the compressible damping mass occurs.

For more positive heat transfer from the elastomeric damping mass, especially where such mass is of substantial volume and the superficially contacting heat transfer means are inadequate to attain the degree or speed of heat transfer desired, especially from the interior of the body of the damping mass, the heat transfer arrangement exemplified in FIGURE 3 may be employed. In this instance, an elastomeric damping mass 27' carried by a member 25' and at least partially confined within a cavity or recess 28' is provided with internal direct heat transfer means of high efficiency connecting with either or both the metal mounting member 25' in the confined areas of the damping mass and through the unconfined areas of the mass with surrounding gas or liquid. In this instance such internal to external heat transfer is effected by thin flexible metallic heat transfer means 41 on the order of crinkled aluminum foil strips, such as may be of one to two mil thickness, fine copper wire, spun strands, or the equivalent. While the heat transfer means 41 have been illustrated as more or less haphazardly interspersed indeterminate length and interlaced strands, they may comprise predetermined length strands running in more or less oriented fashion to the surfaces defining the recess 28' or to the unconfined surface areas of the damping mass 27' or therebetween. As a result of this structure, heat is dissipated and cooling effected by transfer directly from the interior of the damping mass to the exterior of the mass.

Figure 4:
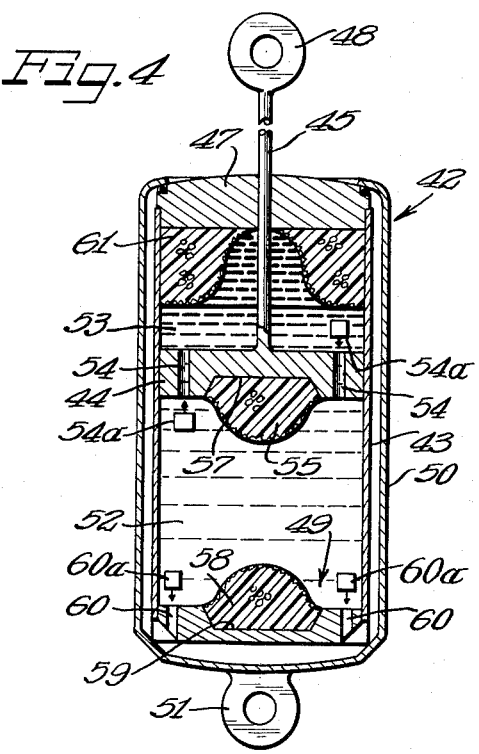
FIGURE 4 is a fragmentary schematic longitudinal sectional detail view through a hydraulic direct acting or telescopic shock absorbing damper according to the invention.

In FIGURE 4 is shown an adaptation of the invention to a direct acting or telescopic shock absorber 42 of a type which is well known in the art insofar as its mechanical features are concerned, and the disclosure here will be recognized as more or less schematic. Such a shock absorber includes a cylinder 43 within which is reciprocably operable a piston 44 having a piston rod 45 which projects through an end closure 47 on the one end of the cylinder and has suitable connecting means such as a ring-shaped connector or eye 48 for attachment to one of relatively movable bodies such as the body of a vehicle. At its opposite end the cylinder 43 seats on a foot valve member 49 which in turn seats in the bottom of a reservoir shell 50 which has on its outer end a connecting device such as an eye-shaped member 51 or a stud for attachment to the opposite of the relatively movable bodies such as the running gear of a vehicle.

Normally the springs of the vehicle hold the oppositely movable portions, namely the body or chassis and running gear such as the axle housings in spaced sprung relation, and the piston 44 therefor assumes a generally midway position in the cylinder 43, defining a compression working chamber 52 between the piston and the foot valve assembly 49 and a rebound working chamber 53 on the piston rod side of the piston. During a compression stroke of the piston 44 hydraulic damping is effected by controlled displacement of hydraulic fluid in the working chambers through one or more restricted passages 54 in the form of ports or orifices from the compression chamber 52 through the piston into the rebound chamber 53, with piston rod fluid displacement being into the reservoir through the foot valve 49. On rebound, reverse damping orifice flow through one or more of the passages 54 occurs, namely from the rebound chamber into the compression chamber, and replenishment flow occurs from the reservoir through the foot valve 49 into the compression chamber. If desired damping control valves 54a, shown schematically, may be provided for the passages 54.

Since the hydraulic damping fluid is relatively incompressible and the inherent resiliency of the metal parts of such a shock absorber are virtually negligible, short amplitude, high shock loads or rapid short duration high impact loads, and particularly those involving vibratory, flutter conditions or approaching lower frequency audible sound during compression stroke are virtually undamped and the shock vibrations on impact in conventional forms of the damper are transmitted through the piston and piston rod and its connection with the body of the vehicle, or other body or structure to which the same is connected, as a tactile reaction or perceptible jolt. Often the result is a sonic vibration in the damper system, apparent as noise. Numerous and varied and often highly complex types of series or parallel operable porting and valving and the like have heretofore been proposed to solve this problem but have generally been of such complexity and oftentimes uncertain and limited performance as to be unwarranted from a cost/performance standpoint and generally a low cost valve arrangement has been used, with compromise attempts at damping by use of auxiliary springs, rubber bushings in the connections, and the like.

A valuable contribution to better understanding of the problems inherent in prior damping systems, but demonstrating the addition of a complexity into the system for overcoming prior deficiencies, is found in B. E. O'Connor Patent 2,777,544, issued January 15, 1957. At least to the extent of the theoretical, mathematical, analytical, schematic and graphic comparisons and demonstrations of the O'Connor patent disclosure, and including FIGURES 1, 2 and 3 and the text pertinent thereto, they are adopted and made a part of the present disclosure as demonstrating the validity and importance of the discovery and inventive novelty inherent in the present disclosure, especially when taken in conjunction with the pertinent disclosures in my aforesaid copending applications, also included herein by reference, and more particularly the analytical and test results spring rate curve chart or graph of FIGURE 11 of Serial No. 123,917.

Similarly as in the damper of FIGURE 1 herein (which corresponds to FIGURE 16 in S. N. 123,917), a deformable, elastomeric damping mass 55 is located between the compression side of the piston 44 and the bottom of the compression chamber 52, in this instance carried by the compression end of the piston. For this purpose, the compression end of the piston is desirably provided with a recess or cavity 57 partially confining the damping mass 55 suitably retained therein as by bonding. Although the damping mass 55 need not necessarily project beyond the end of the piston 44, the compression end face of the damping mass must be exposed to the damping fluid in the compression chamber 52, and for optimum results should be freely, directly and unobstructedly exposed to the damping fluid. In a desirable form, the exposed portion of the damping mass 55 does project beyond the compression end face of the piston and is of generally buttonlike ogee curvature form. At least a substantial portion of the volume of the damping mass 55 and more particularly of the exposed, button-like portion comprises a plurality of gas filled, unconnected, discrete and independently acting generally bubble-like cells and also, if desired, heat dissipating means in accordance with principles and structures discussed hereinbefore. The particular volume, stiffness, material, bubble sizes and relationships in depth are subject to determination and selection in accordance with the parameters required in the damping system.

In addition to, or alternatively, a multi-bubble damping mass 58 may be mounted in the end of the compression chamber 52 opposite the piston 44 as for example on the floor provided by the foot valve member 49 in this instance. In a desirable form, the damping mass 58 may be similar to the piston-carried mass 55 and secured as by bonding in a suitable cavity or recess 59 in the upper end of the foot valve member 49, with one or more bleed or displacement orifice passages 60 through the foot valve member clear of the damping mass with control valving 60a of any known or preferred form associated therewith. As shown, the damping mass 58 projects from the compression chamber end of the foot valve member 49 and is of ogee button-like projecting form similar to the damping mass 55 on the piston, although either or both of the damping masses may have a more flattened crown, or may have a cross-sectional shape similar to the concave side and flattened crown shape of the damping masses 27 of FIGURE 1. Further, instead of the button-like form of the damping masses 55 and 58, the ring forms of damping mass as shown in FIGURE 1 may be used.

During relative movement of the cylinder 43 and piston 44 in a compression stroke, normal relatively low frequency long travel movements are damped primarily by controlled orifice flow in the hydraulic system in the shock absorber or damper 42. However, during high frequency, vibratory compression movements, as when there is a hammer-like, high impact, shock blow condition, the hydraulic fluid cannot escape through the control orifice and a shock wave develops which conventionally is transmitted through the metal of the shock absorber, including the piston, especially into the sprung body connected to the piston rod 45. Herein such high frequency movements or shock loadings are effectively damped by the bulk compression or temporary volume reduction of the bubble damping mass 55 and/or 58. Put another way, the elastomeric bubble damping mass in the compression chamber 52 tends to cushion piston travel in the very short amplitude vibrations incident to the hammer-like shocks or blows, and damps out or attenuates the vibrations as a result of the bulk compressible deformations or distortions in the low gas pressure bubble inter-walls with accompanying high internal or wall friction and high energy absorption incident to the compression shock. This enables substantially smooth substantially vibration-free compression stroking of the piston throughout its compression stroke range, even to buffer contact of the elastomeric damping masses 55 and 58, or of such individual masses against the opposing surface where only one such mass is used. Whether the damping compression of the multi-bubble damping mass is by the damping fluid alone or by virtue of physical contact, or a combination or a succession of such compressive actions, the increasing spring rate characteristics of the bubble mass as previously described afford the highly effective and efficient high frequency damping, and more particularly in the asymptotic curve pattern of FIGURE 11 of Serial No. 123,917, as well as in the graph of FIGURE 3 of O'Connor Patent 2,777,544 which illustrates an amazing similarity in the effective damping constant but which according to that patent is attainable only by a fluid inertia motor arrangement in contrast to the simple, direct, uncomplicated, existing available space damping medium of the present invention.

While rebound shocks are generally of lesser magnitude than compression shocks or vibrations, a multi-cell elastomeric damping mass 61 is desirably disposed in the rebound chamber 53 between the piston 44 and the cylinder end closure 47. This damping mass may be possessed of any of the desirable characteristics hereinbefore described and may be carried by either the piston 44 or the end closure 47, herein being disclosed as comprising a ring member mounted in the reentrant corner defined between the cylinder 43 and the end closure 47 and of a generally ogee exposed face cross-sectional curvature for efficient damping bulk compression under compressive force either of the damping fluid in the rebound chamber or direct damping, buffer impact thereagainst of the piston 44. In the latter instance where the rebound stroke is of such magnitude as to cause direct buffer engagement of the damping mass by the piston, the arrangement may be such that the displacement passage or passages 54 in the piston are closed off by the damping mass 61 acting as a throttling seal, while the bulk compressibility of the damping mass progressively increasingly resists with increasing spring rate further bulk compression thereof by the damping fluid trapped between the piston and the damping mass ring 61, with an efficient motion snubbing action.

Figure 5:
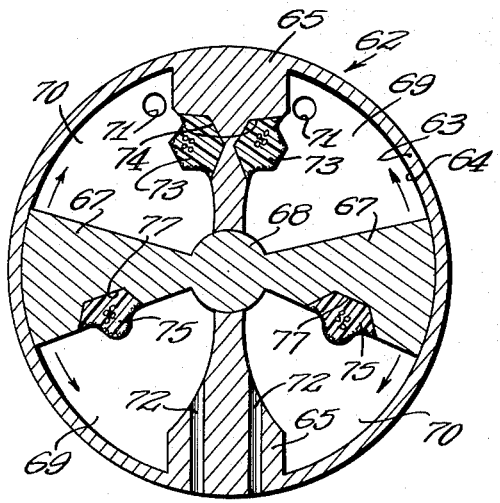
FIGURE 5 is a transverse or diametric schematic sectional detail view through a rotary hydraulic shock absorber or damper or actuator featuring the invention.

In FIGURE 5 adaptation of the present invention to a rotary hydraulic shock absorber, flutter damper, rotary actuator and the like 62 is more or less schematically illustrated. Such a rotary device comprises a casing 63 providing a housing having therein a cylindrical chamber 64 which is divided by one or more abutments 65 and, correspondingly, one or more vanes 67 on a rotary wing shaft 68 into diametrically opposite working subchambers 69 and 70. Where serving as a damper the assembly 62 effects displacement of hydraulic damping fluid between the diametrically opposite pairs of working chambers through restricted passages, usually valve-controlled with resultant energy absorption. Where serving as an actuator, the device 62 responds to relative rotation of the wing shaft and the housing by supplying of the hydraulic fluid under pressure into respective one of each of the sets of working chambers and exhausting of the fluid from the other of the working chambers in each instance. These structures and functions are well known in the art. Merely by way of example one of each pair of the working chambers is shown as equipped with a fluid port 71 through an end wall of the housing adjacent to one of the abutments 65, while the remaining working chamber of each pair is equipped with a fluid port 72 opening from the side of one of the abutments.

In rotary devices as exemplified by 62, shock and vibration damping beyond the capabilities of the hydraulic system, and in a damper beyond the capabilities of the damper valving, have existed as a distinct problem and various leak-off, blow-off, fluid dumping and like expedients have been proposed, but these are simply in the nature of safety measures which do not improve the efficiency of the device, with consequent failure of attainment of the optimum value and effectiveness of these rotary devices which from a general design consideration offer many advantages.

By introducing the highly efficient damping characteristics of deformable elastomeric bubble-cell mass into the working chambers 69 and 70, properly calculated as described, for the parameters of the particular unit 62 higher unit loading, more efficient speeds in operation and greater over-all efficiencies are attainable. For this purpose, a multi-bubble cell elastomeric damping mass 73 may be mounted on each or a selected one of the working chamber faces of one or all of the abutments 65 preferably to project therefrom and also preferably secured in a recess or cavity 74. On the other hand, such a damping mass 75 may be mounted on one or both working chamber faces of one or all of the wing shaft vanes 67 and preferably projecting therefrom and also preferably secured within a suitable cavity recess 77. While the elastomeric bubble-cell damping masses 73 and 75 may be in the form of strips extending at least substantially the length of the supporting face and may either be provided with the truncated crown shape of the illustrative damping masses 73, or the ogee curvature shape of the masses 75, they may also, if desired, be in the form of button-like bodies. In any event, they will function as previously described herein to damp abrupt, shock, high frequency vibrational relative movements of the opposing bodies (considering either the relatively moving apparatus with which the rotary device 62 is operatively connected as such bodies or the abutments 65 and the vanes 67 of such bodies) by the reducing and confining of the damping mass by resilient deformation and bulk compression and resilient compression of the gas in the gas filled buble-like cells to afford the rapidly increasing spring rate with progressively increasing confinement of the mass coupled with rapid generation of internal friction and resultant damping effect, as herein described. In addition, by their projecting relationship toward the opposing face of the wing shaft vane 67 the damping mass 73, and by their opposition to the opposing faces of the wing shaft in respect to the damping masses 75, direct buffer damping is attained at the terminus of rotary stroke in either direction. Further, by proper relationship of the damping mass to the fluid ports, as for example the damping masses 75 with respect to the ports 72, a fluid throttling effect near the terminus of rotary stroke is attainable with highly efficient shock absorption by action of the terminally trapped fluid reacting compressively against the affected damping mass.

Figure 6:
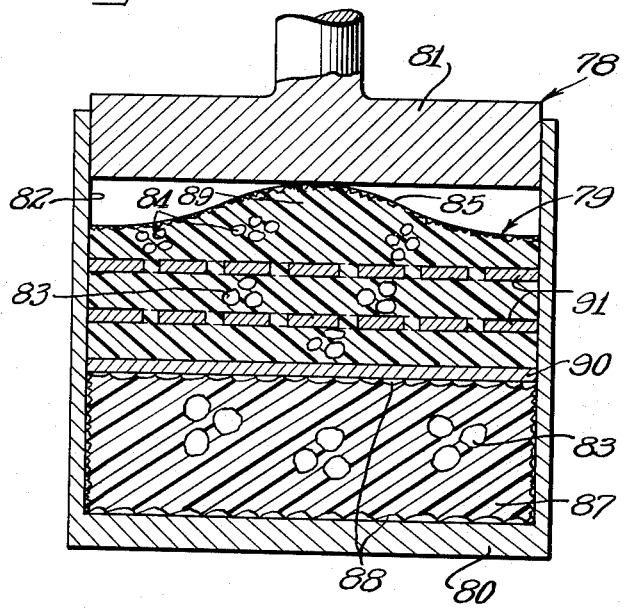
FIGURE 6 is a vertical sectional schematic view through a buffer or bumper device embodying the invention.

In FIGURE 6 is depicted, generally schematically, adaptation of the invention to a dash pot type shock absorber or damper 78 such as is useful in recoil dampers, end bumpers, car stop bumpers, vibration isolating mountings of the kind for location between vibrating equipment, machinery motors and the like or to isolate objects, mechanisms, precision equipment and the like from vibrating or shock-prone environment, etc. In such a friction device, a deformable mass 79 of yieldable plastic material which is provided in at least a substantial portion of its volume with a plurality of gas filled, unconnected, discrete and independently acting, generally bubble-like cells, is interposed between two bodies 80 and 81 which, due to some external forces are caused to move toward one another at an undesirably high amplitude which requires damping. Herein the body 80 is provided with a cavity recess 82 within which the damping mass 79 is confined to at least a substantial extent. Although the relatively movable body 81 is depicted as of generally piston form, this should be construed as representative of any form of body which has a direct engagement with the opposing area of the damping mass 79 and in relatively movable relation to the member or body 80. That the relatively movable body member 81 is depicted as guidedly fitting into side walls of the cavitated body member 80 is merely representative of some means to guide the body members 80 and 81 for relative movement toward one another. Any transverse cross-sectional shape desirable or preferred for the elements of the assembly is contemplated such as cylindrical or other adaptation of circularity, elongated in one dimension, various forms of angularity, etc.

Although the damping mass 79 may comprise a single, monolithic body of material, wherein there is a uniform distribution of gas filled or combination of gas filled and liquid filled cells, numerous adaptations and preferred arrangements to meet desired performance attainments are possible. For example, in one desirable arrangement there is a graduated layering or distribution of the bubble cells including relatively large bubbles 83 deep within the mass, intermediately smaller size bubbles 83 in intermediate regions of the mass and a substantially smaller size of bubbles 84 adjacent to the area of the mass opposing the body member 81 and desirably though not necessarily merging into a skin 85 of such end area of the mass. This order of bubble layering may be reversed, if preferred.

Although the progressively varying size bubble zones may be provided in a monolithic damping mass body, they may also be provided in separately formed and suitably assembled layers. For example, the deepest area containing the largest bubbles 83 is depicted as such a separately formed layer 87 having cut ends 88. Succeeding areas of the damping mass 79 may be similarly formed, if desired.

Although not mandatory, increased efficiency is attained by the arrangement depicted wherein the end area of the mass 79 exposed to the relatively movable body member 81 is provided with a projection 89 adapted to be progressively compressed into the body of the damping mass 79 by the member 81.

For heat transfer from the interior of the damping mass 79 to the walls defining the confining recess 82 which are preferably of a high heat transfer material and may in high heat generation damping circumstances be cooled by air circulation or coolant fluid circulation, suitable heat transfer means are disposed interiorly of the damping body and make heat transfer contact with the confining walls. For example, between separate layers of the damping mass body heat transfer plate means 90 may be interposed. While such plate 90 may be of a rigid material, it may be a thin, flexible foil. Copper and aluminum are suitable heat transfer materials. In another form of heat transfer plate means, one or more perforated heat transfer plates 91 (rigid or flexible foil type) may be molded directly into the damping mass 79 with the edges, or at least heat transfer contact projections exposed and contact the confining wall in heat transfer relation. Large mesh, fine wire screening of high heat transfer material may be utilized as the heat transfer plates 90 or 91.

Figure 7:
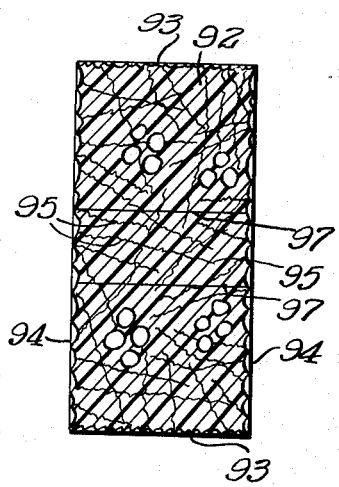
FIGURE 7 is a sectional detail view through a bubble type plastic damping mass adapted to be made by extrusion manufacture and containing heat dissipating means.

In FIGURE 7 is depicted a plastic bubble-containing plastic mass 92 which may, for example, be formed as an extruded piece having a peripheral skin 93 and opposite cut ends 94. This mass may be used in any desirable damping arrangement and is provided with heat transfer means in the form of fine, flexible heat transfer strands 95 which are exposed at least at the cut ends 94. Although the heat transfer strands may be fine wire or tape or bits of heat transfer material, more or less haphazardly as to direction but with some degree of uniformity as to distribution, some or all of the strands may comprise longitudinal pieces 97 comprising parts of a continuous strand in each instance fed along with the material as it is extruded and cut off to the predetermined length of the piece.

In any of the forms of multi-directional heat transfer strands, such as the strands 41 of FIGURE 3 and the strands 94 of FIGURE 7, their characteristics should be such as to avoid any undue limiting of the elastomeric motion in at least the bubble cell containing portions of the damping mass, although under certain circumstances it may be desirable to have such heat dissipating strands in sufficient aggregate mass of strands to afford at least some damping, that is energy absorbing, effect by their frictional interaction under compression. For minimum interference with the elastomeric motion, the heat transfer strands are desirably of a fine, crinkly, curly or like form, with the crinkles or waves, sharp bends or curved changes of direction being on the order of magnitude of the thickness of the fine strands.

Figure 8:
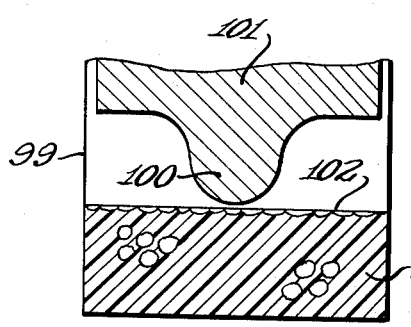
FIGURE 8 is a schematic vertical sectional view through another modification.

Whereas for some purposes a calculated, predetermined progressive rate of increase of engaged area, and thereby the shape of the asymptotic spring rate curve, can be afforded by the engagement of a contoured damping mass projection engageable against an opposing body or member, as represented in FIGURES 4, 5 and 6, further desirable range of spring rate change can be accomplished by having a rigid contoured member or body engage the bulk compressible damping mass as depicted in FIGURE 8. In this arrangement, a bulk compressible damping mass 98 at least partially confined within a suitable cavity or recess in a member or body 99 opposes a contoured rigid projection 100 carried by or forming part of an opposing member or body 101. During a shock absorbing or snubbing action wherein the members or bodies 99 and 101 move toward one another, the contoured projection 100, which may be of the generally ogee contour although it may also have other preferred contour, presses against the opposing damping mass 98 with bulk compressing and increasing spring rate effect as modified by progressively increasing engaged area from the curved nose or projection 100. Although a skin may be provided on the exposed surface of the damping mass 98, a cut surface 102 is desirable where frequent contacts of the projection 100 are expected in service since stretching of a skin might eventually tend to cause a failure which may change the operating characteristics though possibly not disadvantageously. A skin will, of course, afford somewhat greater initial damping resistance.

Figure 9:
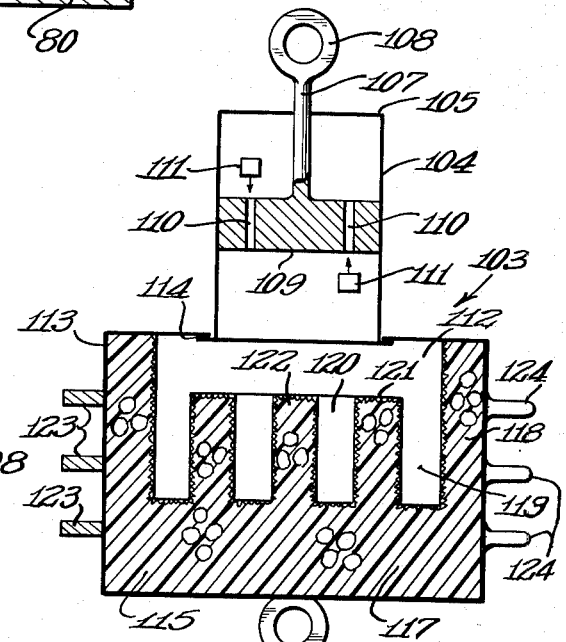
FIGURE 9 is a schematic vertical sectional view through a modified hydraulic direct acting shock absorbing damper embodying the invention.

In another form of direct acting or telescopic shock absorbing damper 103 as schematically illustrated in FIGURE 9, a combination damping and accumulator arrangement is provided on the compression side of the piston although a similar arrangement may be provided on the rebound side, instead of or in addition to the arrangement depicted. As shown, a cylinder 104 has a closure 105 at one end through which extends reciprocably a piston rod 107 having on its outer end a connecting device 108 and on its inner end a piston 109. Thereby the piston divides the cylinder bore into a rebound chamber above the piston as shown and a compression chamber below the piston. Suitable ports 110 through the piston 109 afford passages for displacement of liquid to the opposite sides of the piston, such passages being restricted in any preferred manner and serving, if desired, as liquid damping passages with or without control valving 111.

At its lower or compression end, the cylinder 104 communicates freely with a combination accumulator and damping chamber 112 housed within a casing 113. Although the casing 113 may comprise an integral extension of the cylinder 104, it is shown, alternatively, as a separately formed member attached in any suitable manner by a connection 114 to the adjacent end of the cylinder, such attachment being of any preferred permanent or selectively attachable arrangement, and the illustration is understood to be schematic to represent any preferred arrangement (spun, screw threaded, clamped, riveted, bolted, welded, and the like).

Within the chamber 112 is at least partially confined a substantial damping mass 115 of bulk compressible, at least partially bubble cell material which may be a non-resilient plastic for one time use or a material having elastomeric properties for continuous or repeated use. In order to increase the area of contact of the damping and yieldable take-up mass 115, it may substantially occupy the chamber 112, with a base body 117 of substantial thickness filling the base portion of the housing chamber and having relatively thick side wall portion 118 engaging the side wall of the casing, with any preferred recessing of the surface areas of the damping mass 115 exposed to the damping liquid within the cylinder 104 and the chamber 112. As shown, such recessing may comprise concentric annular upwardly opening recesses 119 and 120 separated by an annular ridge 121 and a central projection 122. Any preferred arrangement or disposition or distribution of the size and character of the individual, discrete bubble cells within the accumulator damping mass 115 may be provided and any preferred profile of the exposed surface of the mass may be afforded.

It will be observed that the damping mass 115 is directly exposed in full, unrestricted communication with the cylinder and the piston and there is a large area of the damping mass 115 exposed to the damping liquid for high energy absorption and especially in the upper range or toward the sonic vibration amplitudes. In the higher range amplitudes the amount of absorption increases as a direct function of the liquid-exposed area that is subject to deformation on compression. Further, by having the volume of the mass 115 large enough and at least part of the mass sufficiently compressible in volume, ample piston rod displacement of hydraulic damping fluid into the chamber 112 as an accumulator is enabled, although the prime function of the mass 115 is for damping.

As illustrated, the casing 113 is of larger diameter than the cylinder 104 in order to afford ample volume in the chamber 112 in minimum length of the unit, but if preferred, of course, the damping-accumulator chamber may be accommodated as an elongation of the cylinder 104 properly proportioned for the purpose. In this arrangement, further, there is preferably, but not necessarily, no direct engagement by the piston with the damping mass 115.

Although substantial cooling of the damping mass 115 is effected by circulation of the damping fluid, additional cooling may be effected as by heat transfer projections or ribs or fins 123 attached to the casing 113 or by fins or ribs 124 formed directly in the wall of the casing.

Where preferred, of course, the bubble cell damping mass may be soft at least in part with low bulk resistance and gradual progressive increase in spring rate as the load increases. In other instances it may be desirable to preload the damping mass as by internal gas pressure or by a preloading through the damping fluid or other means to which the damping mass is exposed. In such preloaded conditions a high spring rate is immediately effected.

While the damping mass is located in a series or in advance of the piston or other member in the physical arrangement which is subject to impact or vibration that must be damped, the action may be likened to a parallel effect in certain modes of action.

To the extent that the movement or travel to be controlled partakes of or includes true impact or shock (as distinguished from normal slower relative movements of the opposed bodies such as wheel travel in a vehicle) which may go on up into the sonic or even super-sonic range of impact, it will be apparent to those skilled in this art that any barrier, grids or other impedances in the path of the shock waves before they hit the damping mass will necessarily transmit the shock waves through the impedance to the body or member, such as the body of an automobile. This will be approximately at least in the proportion or ratio of the impedance to the entire area. In other words, there must be freedom for unimpeded bulk compression of the damping mass by direct impact of the shock wave for full absorption of the shock wave without any bounce-back toward the opposing solid member or body to be damped and more particularly where the shock waves are transmitted through a damping fluid such as in a hydraulic shock absorber.

Figure 10:
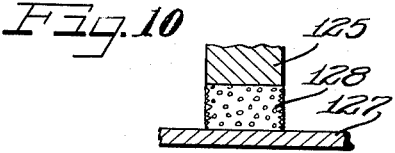
FIGURE 10 represents a further modification.

In FIGURE 10 is shown a cushioning, shock absorbing, damping arrangement wherein opposed rigid, relatively movable members 125 and 127 have therebetween a separating bulk compressible, multi-closed-cell plastic mass 128. In order to attain completely free flexing and sustained uniform damping results, the exposed surfaces of the damping mass 128 are substantially free from any skin which is substantially greater than the average inter-bubble wall thickness. This can be accomplished by suitable molding techniques whereby development of greater than inter-bubble wall thickness at such surfaces is avoided. In another manner of attaining this effect, skin surfaces of a block of the damping material can be cut off. In yet another manner of attaining the same result the block of closed cell damping material 128 can be derived by cutting it from a larger slab of the material. In such instance, the generally semi-spherical depressions where the bubbles on the line of cut have been sheared through will be apparent at the surface. Not only is there less tendency for the substantially skin-free surfaces to bulge or buckle under compression load on the cushioning, damping mass piece, but there is greatly reduced liability of surface cracks developing, primarily because of the substantial elimination of stress or bending zones on the surface areas.

Referring again to FIGURE 3, the damping mass 27′ represents, by way of example, a profiled shape substantially without skin on the exposed surface or at least a substantial portion of the exposed surface, and more particularly in the portions of the surface which are subject to flexing stresses in use. There is thus attained greater assurance of maintenance of performance curve as calculated for the particular damping mass profile which, in the event of rupture of a definite skin would be disturbed and possibly substantially altered, especially in instances where continued fairly critical performance is required, as for example in damping delicate instrumentation and the like.

Actually, freedom from skin on the multi-small-closed cell elastomeric mass produces a useful improved result where the mass is used as a spring primarily or in addition to its damping function, for the same reasons as outlined above, namely, preservation of calculated performance curve, and more particularly the spring rate curve. As a matter of fact, the substantially skinless surfaces of the multi-closed-cell elastomeric material have been found to afford unusually high resistance to tearing as compared to the same material without the discrete, unconnected cellular structure. In an open, connected cell structure of the same material, without skin, or with a broken skin, liability to tearing is greatly increased even as compared to the solid material.

From the foregoing it will be apparent that by the present invention there has been provided unitary, simple, bulk compressible, generally laminar friction generating means of non-passage or non-orifice type highly advantageous for damping especially high frequency movements or vibrations with greatly increased efficiency in attaining the non-linear, rapidly increasing spring rates or effective damping constant, namely the energy dissipating force per unit relative velocity of the terminals of the damping system, toward which this art has striven but has not heretofore satisfactorily attained.

It will be understood that modifications and variations may be effected without departing from the scope of the novel concepts of the present invention.

I claim as my invention:

1. A bulk compressible closed cell elastomeric material mass having in at least a substantial portion of its volume small, generally bubble-like gas cells which are compressible at relatively high spring rates due to their small volumes so that the mass will damp shock motions by bulk compression, heat transfer metallic strands internally of the mass and exposed at the surface of the mass, and means contacting the externally exposed portions of the heat transfer strands in heat transfer relation.

2. A resiliently deformable closed cell bulk compressible elastomeric damping mass having in at least a substantial portion of its volume small, generally bubble-like gas cells which are compressible at relatively high spring rates due to their small volumes, said mass being bulk compressible to develop damping friction therein, and metallic heat transfer strands in said mass and exposed at the surface of the mass for heat transfer from the interior to the surface of the mass, said metallic heat transfer strands being of a flexibility on the order of the flexibility of the damping mass.

3. A resiliently deformable mass of elastomeric closed cell damping material at least a substantial portion of the volume of which comprises small, generally bubble-like gas cells which are compressible at relatively high spring rates, said mass having a cut surface, and metallic heat transfer strands freely movable with the flexings of said mass and exposed at least at the cut surface of the mass.

4. A damper including means defining a chamber and having opposed areas which are relatively movable toward one another with shock motion, a damping liquid in the chamber between said opposed areas, at least one of said areas having a recess therein filled with a bulk compressible friction-generating mass of closed cell resilient material, said mass having a portion projecting toward the opposing surface area and such portion having a crown and sides exposed to and compressibly engaged by the liquid.

5. A damping device as defined in claim 4, in which the sides of said mass are of normally concave cross-sectional shape.

6. A hydraulic damper comprising a cylinder having a stationary surface area,
a piston structure having a surface area opposing said stationary surface area,
a damping liquid in said chamber between said surface areas,
respective opposed closed ring bubble-elastomer damping members carried by said surface areas and arranged for damping engagement on movement of the piston toward the stationary surface area,
and means for metering damping fluid from the area of the chamber closed within said damping members.

7. A device comprising opposed bodies and including:
a respective separable resiliently deformable mass of bulk compressible material carried by each of said opposed bodies,
said masses being opposed to one another,
said masses being thrustable against one another upon movement of said bodies toward one another and being thus bulk compressible to damp such movement,
and at least one of said masses having heat dissipating strands extending therethrough and exposed at the surface of the mass.

8. A device comprising opposed bodies separably and closably movable relative to one another and including:
opposed areas on the bodies having oppositely aligned respective recesses therein,
a respective resiliently deformable mass of bulk compressible material carried within and filling each of said opposed recesses and projecting therefrom toward the opposing mass,
each of said masses comprising in at least a substantial portion of the volume thereof small, generally bubble-like gas cells which are compressible at relatively high spring rates,
and said masses being thrustable against one another upon movement of said bodies toward one another and being thus bulk compressible at a rapidly increasing rate of resistance due to confinement of the masses in the respective recesses whereby to damp such movement.

9. A device as defined in claim 8, in which a body of damping fluid is interposed between said bodies and in engagement with said masses.

10. A device defined in claim 9, in which at least one of said bodies includes damping fluid displacement-controlling means.

References Cited by the Examiner
UNITED STATES PATENTS

| | | | |
|---|---|---|---|
| 1,496,768 | 6/1924 | Booth et al. | 248—358 X |
| 1,886,712 | 11/1932 | Messier | 267—64 |
| 2,313,379 | 3/1943 | Wood | 248—358 |
| 2,327,580 | 8/1943 | Carney | 20—69 |
| 2,425,567 | 8/1947 | Robinson | 248—358 |
| 2,469,596 | 5/1949 | Groom | 267—33 X |
| 2,701,714 | 2/1955 | Harwood | 267—64 |
| 2,744,847 | 5/1956 | Orr. | |
| 2,942,834 | 6/1960 | Clark | 267—1 X |
| 2,980,167 | 4/1961 | Harris et al. | 267—1 |
| 2,995,057 | 8/1961 | Nenzell | 277—171 |
| 3,011,218 | 12/1961 | Mitten | 20—69 |
| 3,045,704 | 7/1962 | Williams. | |
| 3,070,363 | 12/1962 | Ellis | 267—35 X |

FOREIGN PATENTS

| | | |
|---|---|---|
| 1,087,326 | 8/1954 | France. |
| 1,114,439 | 12/1955 | France. |
| 827,144 | 1/1952 | Germany. |

ARTHUR L. LA POINT, *Primary Examiner.*